United States Patent
Jung et al.

(10) Patent No.: US 9,209,649 B2
(45) Date of Patent: Dec. 8, 2015

(54) APPARATUS AND METHOD FOR CHARGING BATTERY IN A PORTABLE TERMINAL WITH SOLAR CELL

(71) Applicant: Samsung Electronics Co., Ltd., Suwon-si, Gyeonggi-do (KR)

(72) Inventors: Ki-Chung Jung, Seongnam-si (KR); Seung-Su Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 14/140,232

(22) Filed: Dec. 24, 2013

(65) Prior Publication Data

US 2014/0103856 A1    Apr. 17, 2014

Related U.S. Application Data

(63) Continuation of application No. 13/091,565, filed on Apr. 21, 2011, now Pat. No. 8,633,672.

(30) Foreign Application Priority Data

Apr. 22, 2010 (KR) ........................ 10-2010-0037237

(51) Int. Cl.
*H01M 10/44* (2006.01)
*H01M 10/46* (2006.01)
*H02J 7/35* (2006.01)

(52) U.S. Cl.
CPC ........................................ *H02J 7/35* (2013.01)

(58) Field of Classification Search
CPC .......... H02J 7/35; H02J 7/0021; H02J 7/0047; H02J 7/007; H02J 7/047
USPC .......... 320/101, 107, 114, 115, 128, 132, 150; 136/291, 292, 293
See application file for complete search history.

(56) References Cited

U.S. PATENT DOCUMENTS

| 4,349,775 A | 9/1982 | Kwon et al. |
| 8,305,030 B2 | 11/2012 | Lee et al. |
| 8,633,672 B2 * | 1/2014 | Jung et al. ..................... 320/101 |
| 2008/0084178 A1 | 4/2008 | Dowd et al. |

* cited by examiner

*Primary Examiner* — Edward Tso
(74) *Attorney, Agent, or Firm* — Jefferson IP Law, LLP

(57) ABSTRACT

A method for charging in a portable terminal is provided. The method includes charging a battery of an electronic device, using a natural resource, monitoring a charging state of the battery, and booting the electronic device based at least in part on the charging state and a determination that the electronic device is powered off.

20 Claims, 4 Drawing Sheets

APPARATUS AND METHOD FOR CHARGING BATTERY IN A PORTABLE TERMINAL WITH SOLAR CELL

PRIORITY

This application is a continuation application of a prior application Ser. No. 13/091,565, filed on Apr. 21, 2011, which claimed the benefit under 35 U.S.C. §119(a) of a Korean patent application filed in the Korean Intellectual Property Office on Apr. 22, 2010 and assigned Serial number 10-2010-0037237, the entire disclosures of each of which is hereby incorporated by reference.

BACKGROUND OF THE INVENTION

1. Field of the Invention

The present invention relates to an apparatus and method for charging in a portable terminal. More particularly, the present invention relates to an apparatus and method for, when a portable terminal with a solar cell charges a battery by a solar light while the portable terminal is powered off, preventing the shortening of a battery lifetime that can take place as a charging temperature of a battery cell increases.

2. Description of the Related Art

In recent years, the use of portable terminals is increasing due to the convenience they provide. Accordingly, service providers (i.e., system manufacturers) are competitively developing portable terminals having more convenient functions to increase their user base.

For example, portable terminals are providing functions of a phone book, a game, a scheduler, a Short Message Service (SMS), a Multimedia Message Service (MMS), a Broadcast Message Service (BMS), an Internet service, an Electronic mail (e) mail service, a wake-up call, a Motion Picture Expert Group (MPEG)-1 or MPEG-2 Audio Layer-3 (MP3) player, a digital camera, and other similar products and services.

In order to provide mobility, portable terminals make use of chargeable batteries as a power supply. Since the chargeable battery is limited in capacity, if the use of the portable terminal increases, a battery consumption time is shortened. This creates an issue in that users have to determine a State Of Charge (SOC) of the chargeable battery for a long travel or outing, and have to charge the chargeable battery by supplying an external power source to the chargeable battery.

In order to address the above issues, portable terminals having solar cells are being introduced that employ solar power to charge the battery.

Portable terminals with solar cells can discontinue a charging function depending on a charging temperature of a battery cell while charging a battery using solar power. This prevents reductions in the useful lifetime and damage to the battery cell resulting from continuous charging using solar power.

However, portable terminals can control an operation of the charging function through the above function only while powered on. When the portable terminal performs a process of charging using solar power while powered off, the portable terminal cannot control the charging function because the portable terminal cannot sense the charging temperature of the battery cell while the portable terminal is powered off. As a result, when the portable terminal performs a continuous charging process via solar power while powered off, the battery may be damaged and its useful life reduced.

SUMMARY OF THE INVENTION

Aspects of the present invention are to address at least the above problems and/or disadvantages and to provide at least the advantages described below. Accordingly, an aspect of the present invention is to provide an apparatus and method for improving the charging performance of a portable terminal using a solar light.

Another aspect of the present invention is to provide an apparatus and method for, when absorbing a solar light while powered off, allowing automatic entry into a power on state in a portable terminal using the solar light.

A further aspect of the present invention is to provide an apparatus and method for, while absorbing a solar light while powered off, generating a signal for allowing entry into a power on state in a portable terminal using the solar light.

The above aspects are achieved by providing an apparatus and method for battery charging in a portable terminal with a solar cell.

In accordance with an aspect of the present invention, an apparatus for charging a battery in a portable terminal with a solar cell is provided. The apparatus includes a controller and a charging management unit. The controller controls the charging management unit, absorbs a solar light, and charges the battery. The charging management unit senses a charging temperature of a battery cell when the portable terminal charges the battery while the portable terminal is powered off.

In accordance with another aspect of the present invention, a method for charging a battery in a portable terminal with a solar cell is provided. The method includes absorbing a solar light and charging the battery, and sensing a charging temperature of a battery cell when the portable terminal charges the battery while the portable terminal is powered off.

In accordance with another aspect of the present invention, a charging apparatus using a solar cell is provided. The apparatus includes a solar cell panel for absorbing a solar light for charging a battery of a portable terminal and for providing an output power source to the battery, a battery state determiner for measuring a charging voltage of the battery charged based on the solar light absorbed through the solar cell panel, a signal generator for generating a booting signal for booting the portable terminal, and an operation determiner for determining a terminal operation state at a time when the solar cell panel operates.

In accordance with another aspect of the present invention, a portable terminal is provided. The portable terminal includes a battery for supplying power to the portable terminal, and a charging apparatus including a solar cell panel for generating power based on solar light incident on the solar cell panel, a battery state determiner for measuring a charging voltage of the power supplied to charge the battery by the solar cell panel, a signal generator to generate a booting signal to boot the portable terminal when the portable terminal is powered off, and an operation determiner for determining whether to control the signal generator to generate the booting signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
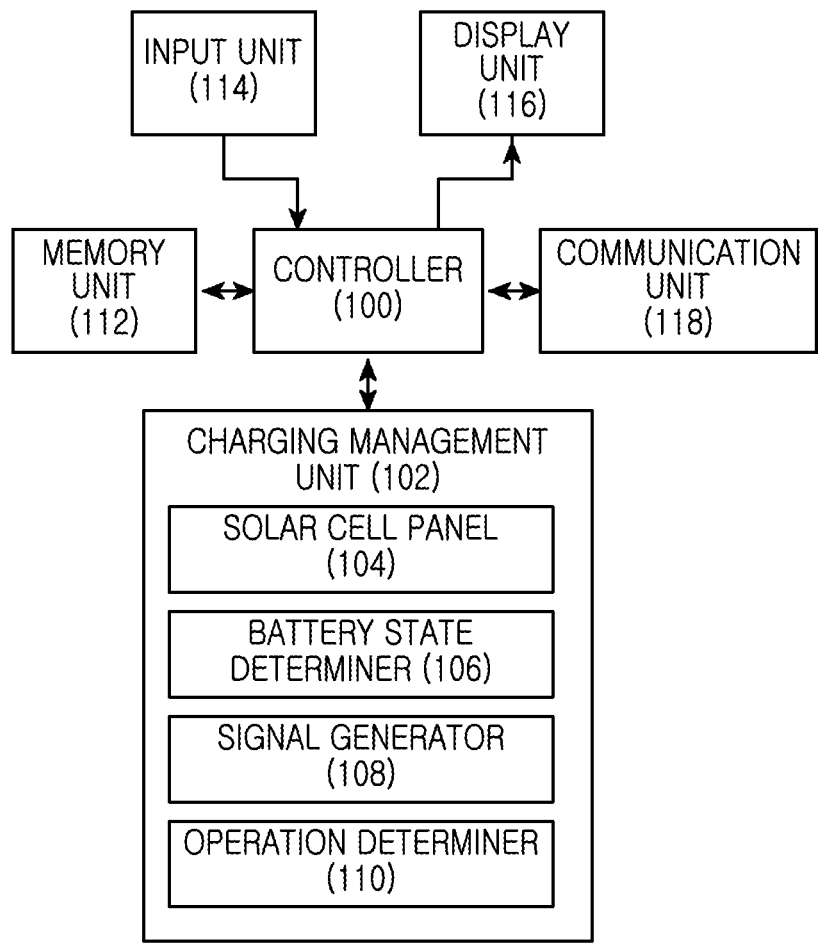
FIG. 1 is a block diagram illustrating a construction of a portable terminal performing a battery charging process according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and method for controlling to allow automatic entry into a power on state and sense a charging temperature of a battery cell in case of absorbing a solar light in a power off state in a portable terminal using the solar light according to the present invention and, due to this, improving the charging performance of the portable terminal.

FIGS. 1 through 4, described below, and the various exemplary embodiments of the present invention provided are by way of illustration only and should not be construed in any way that would limit the scope of the present invention. Those skilled in the art will understand that the principles of the present disclosure may be implemented in any suitably arranged communications system. The terms used to describe various exemplary embodiments of the present invention are provided merely to aid the understanding of the description, and their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram illustrating a construction of a portable terminal performing a battery charging process according to an exemplary embodiment of the present invention.

Referring to FIG. 1, the portable terminal includes a controller 100, a charging management unit 102, a memory unit 112, an input unit 114, a display unit 116, and a communication unit 118. The charging management unit 102 includes a solar cell panel 104, a battery state determiner 106, a signal generator 108, and an operation determiner 110. The portable terminal may include additional units that are not illustrated here merely for sake of clarity. Similarly, the functionality of two or more of the above units may be integrated into a single component.

The controller 100 controls general operations of the portable terminal. For example, the controller 100 performs processing and control for voice call and data communication. In addition to these general functions, the controller 100 performs a booting process for controlling a charging function making use of solar light. In order to address the reduction in battery lifetime due to the inability to measure a charging temperature of a battery cell when performing a charging process while the portable terminal is powered off, when the controller 100 receives a booting signal from the charging management unit 102, the controller 100 performs a booting process and powers on the portable terminal 100.

When the solar cell panel 104 absorbs the solar light and provides an output power source, the charging management unit 102 determines an operation state of the portable terminal. If the charging management unit 102 determines that the portable terminal is powered off, the charging management unit 102 powers on and boots the portable terminal.

The charging management unit 102 continuously determines a charging voltage of a battery of the portable terminal while the portable terminal charges the battery in the power off state. When the charging voltage is greater than or equal to a threshold, the charging management unit 102 boots the portable terminal.

The solar cell panel 104 of the charging management unit 102 absorbs the solar light for charging the battery of the portable terminal, and provides an output power source to the battery.

The battery state determiner 106 of the charging management unit 102 measures a charging voltage of a battery charged using a solar light under the control of the charging management unit 102. In order to determine when to boot the portable terminal, the battery state determiner 106 measures the charging voltage of the battery. The battery state determiner 106 can determine if circumstances indicate that the useful lifetime of the battery may be reduced (e.g., the charging temperature of a battery cell is increasing, and the like) in order to boot the portable terminal.

The signal generator 108 of the charging management unit 102 generates a signal for booting the portable terminal being in the power off state. The signal generator 108 generates a signal for powering on the portable terminal and provides the signal to the controller 100, when the charging management unit 102 determines that the portable terminal is powered off and is performing a charging process using a solar light.

The operation determiner 110 determines an operation state of the portable terminal. The operation determiner 110 determines if the portable terminal is powered on or powered of, when the solar cell panel 104 operates.

The memory unit 112 may include a Read Only Memory (ROM), a Random Access Memory (RAM), a flash ROM, or other similar storage devices. The ROM stores a microcode of a program for processing and controlling the controller 100 and the charging management unit 102 and a variety of kinds of reference data.

The RAM, a working memory of the controller 100, stores temporary data generated in execution of a variety of kinds of programs. The flash ROM stores several types of updateable depository data such as a phone book, an outgoing message, an incoming message, and the like.

The input unit 114 may include numeral key buttons '0' to '9', a menu button, a cancel button, an OK button, a talk button, an end button, an Internet button, navigation key buttons, a plurality of function keys such as a character input key and other similar input keys and buttons. The input unit 114 provides key input data corresponding to a key pressed by a user to the controller 100.

The display unit 116 displays state information generated during the operation of the portable terminal, limited number of characters, a large amount of moving pictures and still pictures, and the like. The display unit 116 can be a color Liquid Crystal Display (LCD), an Active Mode Organic Light Emitting Diode (AMOLED) display, and other similar display apparatuses. When the display unit 116 includes a touch input device and is applied to a portable terminal of a touch input scheme, the display unit 116 can be used as an input device of the portable terminal.

The communication unit 118 transmits/receives and processes a wireless signal of data input/output through an antenna (not illustrated). For example, in a transmission mode, the communication unit 118 processes original data through channel coding and spreading, converts the original data into a Radio Frequency (RF) signal, and transmits the RF signal. In a reception mode, the communication unit 118 converts a received RF signal into a baseband signal, processes the baseband signal through de-spreading and channel decoding, and restores the signal to original data.

A role of the charging management unit 102 can be implemented by the controller 100 of the portable terminal. However, these are separately constructed and shown herein as an exemplary construction for description convenience, and not to limit the scope of the present invention. It would be understood by those skilled in the art that various modifications of construction can be made within the scope of the present invention. For example, construction can also be such that all of the disclosed functions are processed in the controller 100.

Figure 2:
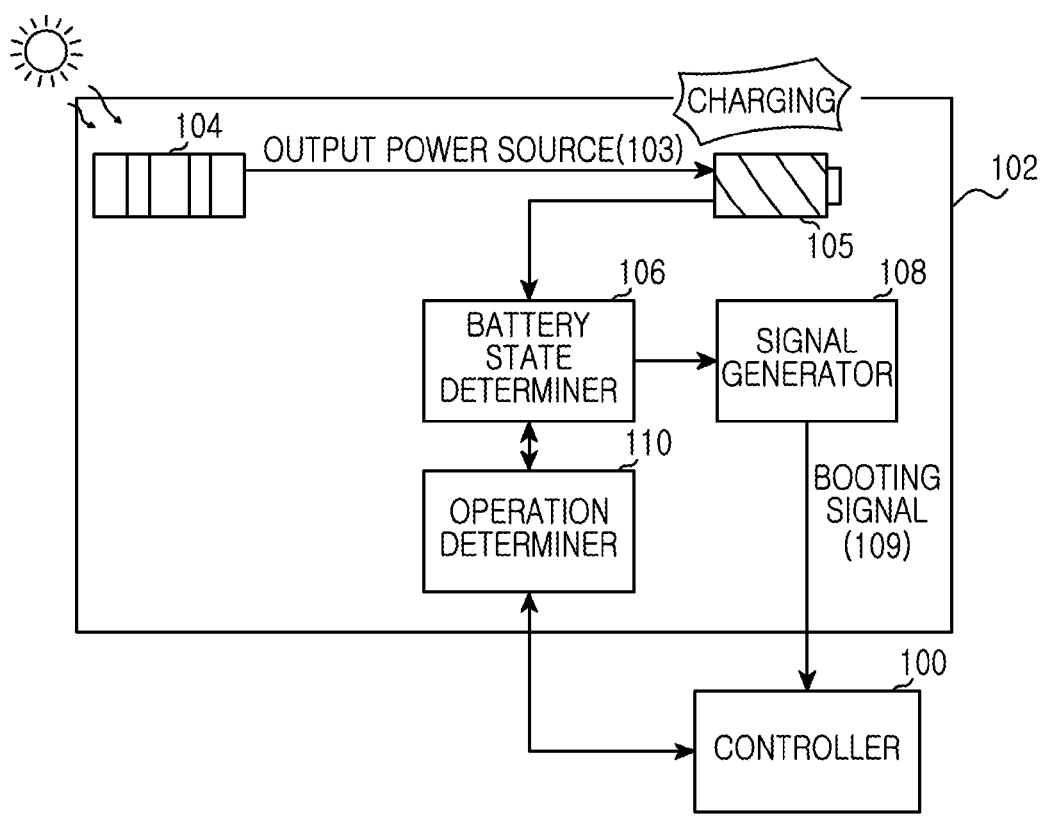
FIG. 2 is a diagram illustrating a battery charging process of a charging management unit according to an exemplary embodiment of the present invention.

FIG. 2 is a diagram illustrating a battery charging process of a charging management unit according to an exemplary embodiment of the present invention.

Referring to FIG. 2, when the charging management unit 102 charges a battery using a solar light while the portable terminal is powered off, the charging management unit 102 can discontinue a charging function depending on a charging temperature of a battery cell.

The charging management unit 102 absorbs, by a solar cell panel 104, a solar light and provides the solar light as an output power source 103 of a battery 105, thereby attempting battery charging.

The operation determiner 110 of the charging management unit 102 determines an operation state of the portable terminal. For example, the operation determiner 110 determines whether the portable terminal is powered off in order to determine when to perform a booting process for controlling a charging function making use of a solar light (i.e., a charging function discontinued depending on a charging temperature of a battery cell).

When the operation determiner 110 determines that the portable terminal is in a power on state, the controller 100 can discontinue the charging function depending on the charging temperature of the battery cell.

On the other hand, when the operation determiner 110 determines that the portable terminal is powered off, the controller 100 is unable to determine the charging temperature of the battery cell.

Accordingly, the battery state determiner 110 processes a signal generator 108 to generate a booting signal when the battery state determiner 110 determines that a charging voltage of a battery 105 is greater than or equal to a threshold or determines that the solar cell panel 104 operates while the portable terminal is powered off.

If the signal generator 106 receives a request for generating a booting signal from the battery state determiner 106 as above, the signal generator 108 provides the booting signal to the controller 100 and changes an operation mode from the power off state to the power on state.

Figure 3:
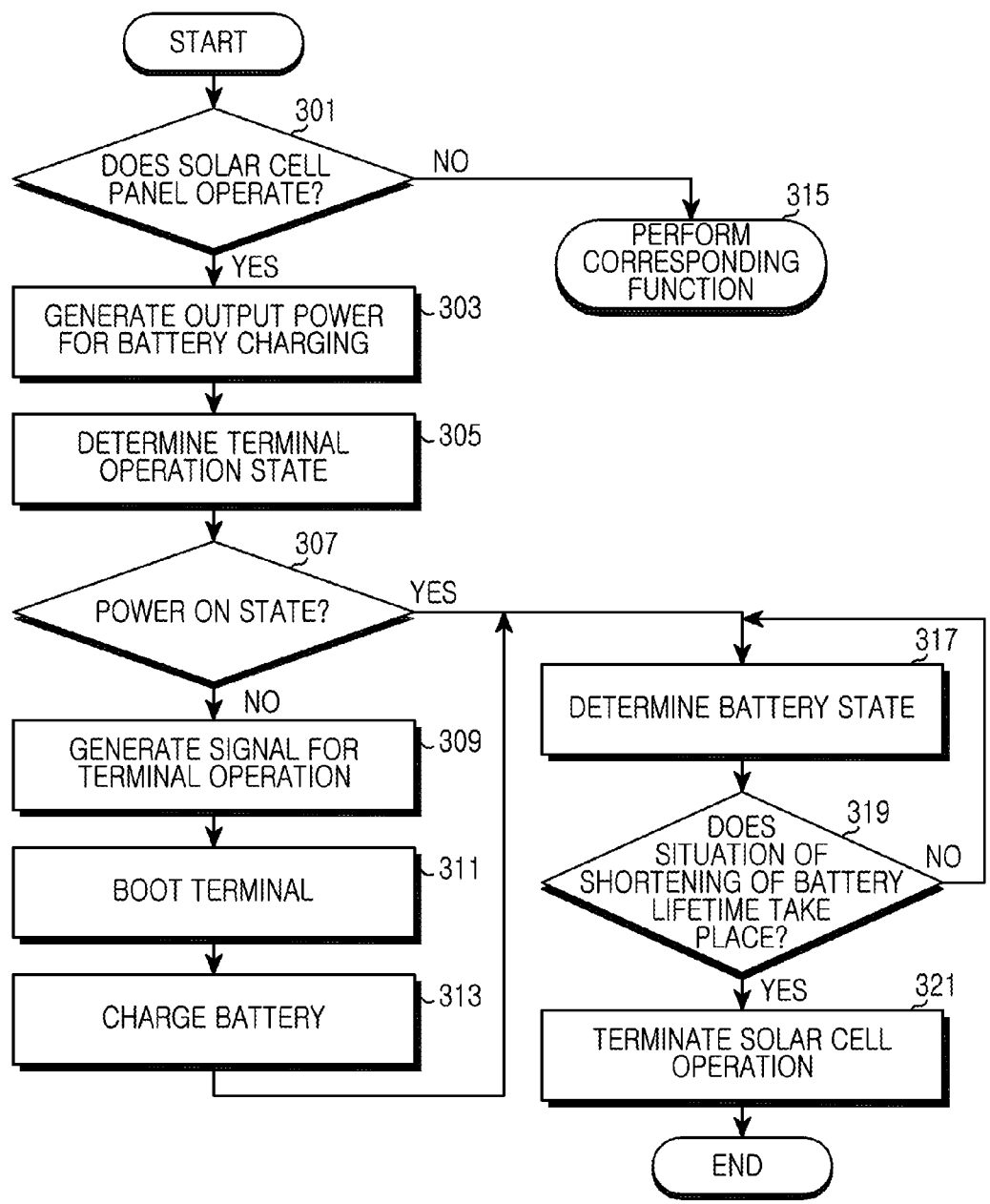
FIG. 3 is a flowchart illustrating a process of automatically powering on while absorbing a solar light while powered off in a portable terminal according to an exemplary embodiment of the present invention.

FIG. 3 is a flowchart illustrating a process allowing automatic entry into a power on state when absorbing a solar light while a portable terminal is powered off according to an exemplary embodiment of the present invention.

Referring to FIG. 3, the portable terminal and determines whether a solar cell panel operates in step 301. The portable terminal determines if the solar cell panel is exposed to a solar light to absorb the solar light and charge a solar cell.

If it is determined that the solar cell panel does not operate in step 301, the portable terminal proceeds to step 315 and performs a corresponding function (e.g., a wait mode).

On the other hand, if it is determined that the solar cell panel operates in step 301, the portable terminal proceeds to step 303 and processes to generate an output power for battery charging through the solar cell panel that absorbs the solar light. In this fashion, the portable terminal enables the battery charging using the solar light without external power source supply.

The portable terminal proceeds to step 305 and determines an operation state of the portable terminal. The portable terminal determines whether the portable terminal is powered on or powered off. This is to determine when to boot the portable terminal, because the portable terminal cannot control a charging function making use of a solar light, e.g., cannot discontinue the charging function depending on a charging temperature of a battery cell while the portable terminal is powered off.

The portable terminal proceeds to step 307 and determines the result of step 305. If it is determined that the portable terminal is powered off in step 307, the portable terminal determines that it is time to perform a booting process for controlling the charging function making use of the solar light in the portable terminal.

After determining that it is time to perform the booting process as above, the portable terminal proceeds to step 309 and generates a signal for terminal operation. The portable terminal proceeds to step 311 and boots the portable terminal. The portable terminal processes a signal generator of a charging management unit to generate a signal for terminal operation and, after determining that the signal generator generates the signal for terminal operation, the charging management unit boots the portable terminal.

The portable terminal proceeds to step 313 and charges a battery. The portable terminal proceeds to step 317 and determines a state of the battery. The portable terminal determines the state of the battery in order to discontinue the charging function depending on the charging temperature of the battery cell.

If it is determined that the portable terminal is in the power on state in step 307, the portable terminal proceeds to step 317 and determines the state of the battery.

The portable terminal proceeds to step 319 and determines whether circumstances indicate that the useful lifetime of the battery is being reduced. Such circumstances may occur, for example, when the charging temperature of the battery cell is greater than or equal to a threshold or more. This may indicate that the charging function is to be automatically discontinued.

If it is determined that the situation of shortening the lifetime of the battery does not take place in step 319, the portable terminal again performs the procedure of step 317.

On the other hand, if it is determined that the useful lifetime of the battery is being reduced in step 319, the portable terminal proceeds to step 321 and terminates the operation of the solar cell panel to prevent this reduction.

Figure 4:
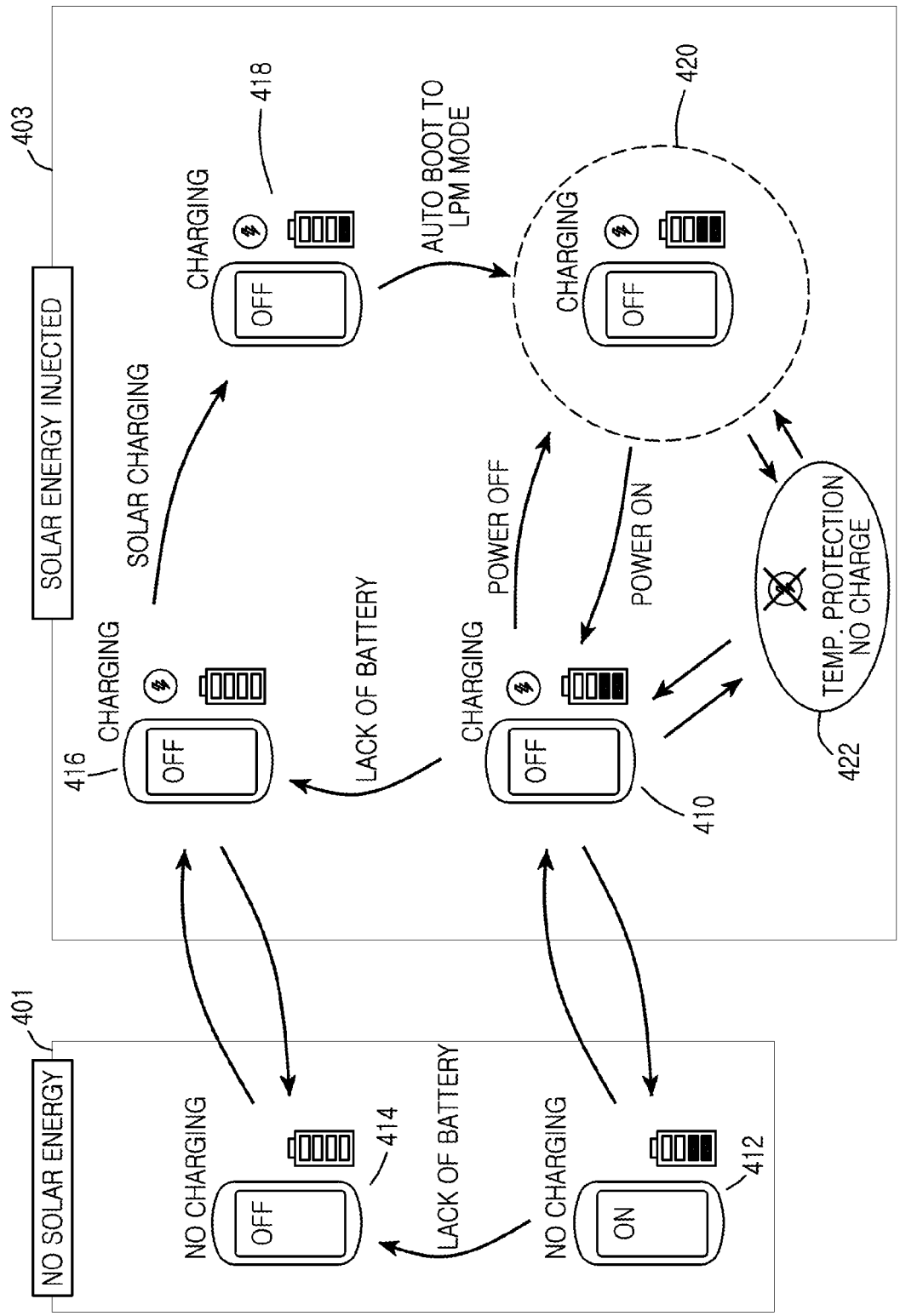
FIG. 4 is a diagram illustrating a battery charging process of a portable terminal according to an exemplary embodiment of the present invention.

FIG. 4 is a diagram illustrating a battery charging process of a portable terminal according to an exemplary embodiment of the present invention.

Referring to FIG. 4, the portable terminal can charge a solar cell through a solar cell panel. The portable terminal can be located in an area 403 exposed to a solar light or an area 401 not exposed to the solar light.

As the solar cell panel absorbs a solar light and charges the solar cell, the portable terminal can charge the solar cell when the portable terminal is located (410) in the exposure area 403, and the portable terminal cannot charge the solar cell when the portable terminal is located (412) in the non-exposure area 401.

For example, when the portable terminal located (410) in the exposure area 403 charges the solar cell while powered on, the portable terminal periodically determines a state of a battery (i.e., a charging temperature of a battery cell) and determines whether circumstances indicate that the useful lifetime of the battery is being reduced. If these circumstances are occurring, the portable terminal discontinues an operation of the solar cell panel, discontinuing a process of charging the solar cell.

On the other hand, when the portable terminal located (410) in the exposure area 403 moves (412) to the non-exposure area 401, the portable terminal cannot perform the process of charging the solar cell by a solar light. If the portable terminal remains in the non-exposure area 401, battery consumption occurs and a situation where the portable terminal powers off takes place (414).

In addition, if the portable terminal moves to the exposure area 403 after power is off as heavy battery consumption takes place although the portable terminal is located (410) in the exposure area 403 or power is off as the portable terminal remains in the non-exposure area 401 as described above, the portable terminal charges (416) the solar cell in a power off state.

When the portable terminal charges (416) the solar cell in the power off state as above, the portable terminal cannot sense the charging temperature of the battery cell, so the portable terminal is not able to control a battery charging function. As a result, if the portable terminal performs a continuous charging procedure while powered off (418), the useful lifetime of the battery may be reduced and damage to the battery may occur due to the solar light.

In order to address the above issue, the portable terminal determines (420) when the solar cell is charged while the portable terminal is powered off or a time when a battery voltage is greater than or equal to a threshold in course of charging the solar cell while the portable terminal is powered off, through a separate charging management unit such as a MIcroCOMputer (MICOM), and generates a signal for booting the portable terminal at the determined time. If the signal is generated, the portable terminal powers on. Accordingly, when the charging temperature of the battery cell is greater than or equal to a threshold, the portable terminal can discontinue (422) a battery charging process using a solar light. The charging management unit can be composed of a separate device such as a MICOM, so the charging management unit can perform, though the portable terminal powers off, a procedure for booting the portable terminal through low power charged by the solar light.

In this fashion, the portable terminal can address the battery lifetime shortening problem that occurs as the solar cell is continuously charged while the portable terminal is powered off due to battery consumption.

As described above, exemplary embodiments of the present invention, which relate to an apparatus and method for improving charging performance in a portable terminal making use of a solar light, in a case where a solar cell panel operates in a power off state, can generate a signal for booting the portable terminal, thereby allowing entry into a power on state and then measuring a charging temperature of a battery cell.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
charging a battery for an electronic device while the electronic device is turned off;
monitoring a state of the charging of the battery;
turning on the electronic device based at least in part on a determination that the state indicates that the battery is at least partially charged, the turning on the electronic device including controlling the charging of the battery differently than when the electronic device is turned off.

2. The method of claim 1, wherein the charging comprises:
harvesting energy from a resource external to the electronic device.

3. The method of claim 2, wherein the resource comprises solar energy.

4. The method of claim 2, wherein the harvesting comprises:
collecting solar energy using at least one solar cell.

5. The method of claim 1, wherein the monitoring comprises:
determining a level of the charging or a temperature of the battery; and
determining that the level or temperature falls into a corresponding one of specified ranges.

6. The method of claim 1, wherein the turning on the electronic device comprises:
booting the electronic device.

7. The method of claim 1, wherein the controlling comprises:
determining that at least one cell of the battery is non-safe based at least in part on the state of the charging of the battery.

8. The method of claim 7, wherein the determining is based at least in part on a temperature of the battery or the electronic device falling into a specified range.

9. The method of claim 1, wherein the controlling comprises:
deactivating at least one solar cell.

10. An apparatus for charging an electronic device, the apparatus comprising:
a charger to charge a battery for the electronic device while the electronic device is turned off; and
a charging management unit operatively coupled to the charger, the charging management unit configured to:
monitor a state of the charging of the battery, and
turn on the electronic device based at least in part on a determination that the state indicates that the battery is at least partially charged, the turning on the electronic device including controlling the charging of the battery differently than when the electronic device is turned off.

11. The apparatus of claim 10, wherein the charger is configured to:
discontinue the charging of the battery based at least in part on the turning of the electronic device.

12. The apparatus of claim 10, wherein the charger comprises:
a solar cell to collect solar energy.

13. The apparatus of claim 10, wherein the charging management unit is implemented with a microprocessor, a power consumption in the microprocessor being lower than that of the electronic device.

14. An electronic apparatus comprising:
a display to present state information in relation with the apparatus;
a charger to charge a battery for the apparatus; and
a controller operatively coupled to the charger and configured to:
monitor a state of the charging of the battery, and
turn on the apparatus based at least in part on a determination that the state indicates that the battery is at least partially charged, the turning on the apparatus including controlling the charging of the battery differently than when the apparatus is turned off.

15. The electronic apparatus of claim 14, wherein the charger is configured to:
discontinue the charging of the battery based at least in part on the turning on the apparatus.

16. The electronic apparatus of claim 14, wherein the charger comprises:
a solar cell to absorb solar energy.

17. The apparatus of claim 14, wherein the controller is configured to:
determine that at least one cell of the battery is non-safe based at least in part on the state of the charging of the battery.

18. The apparatus of claim 17, wherein the controller is configured to:
determine that the at least one cell of the battery is non-safe based at least in part on a determination that a temperature of the battery or the apparatus falls into a specified range.

19. The apparatus of claim 14, wherein the controller is configured to:
present, via the display, information corresponding to the state of the charging of the battery.

20. The apparatus of claim 14, further comprising:
a memory to store information indicating the state of the charging of the battery.

* * * * *